(12) United States Patent
Kushler

(10) Patent No.: US 8,884,872 B2
(45) Date of Patent: Nov. 11, 2014

(54) GESTURE-BASED REPETITION OF KEY ACTIVATIONS ON A VIRTUAL KEYBOARD

(75) Inventor: Clifford A. Kushler, Lynnwood, WA (US)

(73) Assignee: Nuance Communications, Inc., Burlington, MA (US)

( * ) Notice: Subject to any disclaimer, the term of this patent is extended or adjusted under 35 U.S.C. 154(b) by 424 days.

(21) Appl. No.: 12/950,835

(22) Filed: Nov. 19, 2010

(65) Prior Publication Data

US 2011/0122081 A1 May 26, 2011

Related U.S. Application Data

(60) Provisional application No. 61/263,100, filed on Nov. 20, 2009.

(51) Int. Cl.

| | |
|---|---|
| *G09G 5/00* | (2006.01) |
| *G06F 3/041* | (2006.01) |
| *G06F 3/00* | (2006.01) |
| *G06F 3/02* | (2006.01) |
| *G06F 3/033* | (2013.01) |
| *G06F 3/048* | (2013.01) |
| *G06F 3/0488* | (2013.01) |
| *G06F 3/023* | (2006.01) |

(52) U.S. Cl.
CPC .......... *G06F 3/0233* (2013.01); *G06F 3/04886* (2013.01); *G06F 3/04883* (2013.01)
USPC ........... 345/156; 345/168; 345/173; 715/700; 715/823; 715/834; 715/863

(58) Field of Classification Search
USPC ............................ 345/156–184; 715/700–866
See application file for complete search history.

(56) References Cited

U.S. PATENT DOCUMENTS

| | | | |
|---|---|---|---|
| 5,953,541 | A | 9/1999 | King et al. |
| 6,094,197 | A | 7/2000 | Buxton et al. |
| 7,098,896 | B2 | 8/2006 | Kushler et al. |
| 7,382,358 | B2 | 6/2008 | Kushler et al. |
| 2005/0052406 | A1* | 3/2005 | Stephanick et al. .......... 345/156 |

(Continued)

FOREIGN PATENT DOCUMENTS

| | | |
|---|---|---|
| EP | 1555601 A2 | 7/2005 |
| EP | 2336852 A2 | 6/2011 |

OTHER PUBLICATIONS

Extended European Search Report for European Patent Application No. EP10192007.2, Mail Date Oct. 12, 2012, 8 pages.

*Primary Examiner* — Alexander S Beck
*Assistant Examiner* — Nguyen H Truong
(74) *Attorney, Agent, or Firm* — Perkins Coie LLP

(57) ABSTRACT

Systems and methods for gesture repetition that is easy to repeat quickly. A user is able to quickly repeat any activation of a key, including any of the alternate, overloaded functions that are associated with the key. In addition, by appropriately defining the gesture, a large number of these repetitions can be quickly generated. These repeated activations can be generated much faster than a key can be repeatedly tapped with sufficient accuracy, and far faster than an alternative function can be repeatedly generated when each repetition would require again waiting past an initial time threshold. Furthermore, the number of repetitions can be easily and precisely controlled by the user. As the desired number of repetitions is approached, the user simply begins to repeat the gesture at a slower pace until precisely the desired number of repetitions is achieved.

40 Claims, 3 Drawing Sheets

(56) References Cited

U.S. PATENT DOCUMENTS

| | | | |
|---|---|---|---|
| 2006/0176283 A1* | 8/2006 | Suraqui | 345/169 |
| 2007/0283263 A1* | 12/2007 | Zawde et al. | 715/700 |
| 2010/0251179 A1* | 9/2010 | Cragun et al. | 715/834 |

* cited by examiner

GESTURE-BASED REPETITION OF KEY ACTIVATIONS ON A VIRTUAL KEYBOARD

PRIORITY CLAIM

This application claims priority to U.S. Provisional Patent Application Ser. No. 61/263,100 filed Nov. 20, 2009 and is incorporated herein by reference.

FIELD OF THE INVENTION

The invention relates to a text input system and, more specifically, to a text input system where characters are entered and functions are activated by interacting with a virtual keyboard, such as a keyboard displayed on a touch screen text input system.

BACKGROUND OF THE INVENTION

The origin of the modern keyboard as the primary method for inputting text from a human to a machine dates back to early typewriters in the 19th century. As computers were developed, it was a natural evolution to adapt the typewriter keyboard to use as the primary method for inputting text. For a skilled typist, it has remained the fastest way possible to input text into the computer.

With ongoing efforts to make computers smaller and more portable, the physical keyboard has become one of the most significant limiting factors in just how small a device can become: the physical size of the human finger is not something computer designers could change. As a result, computers for certain portable applications have been designed without a physical keyboard, and use touch-screen based input methods as the primary form of human-computer interface. (This is also the case for some applications where people are physically unable to use a keyboard, such as persons with physical disabilities.)

Input methods that are designed for portable touch-screen based devices may have two primary requirements that frequently conflict with each other. The method of input should be as fast as possible and at the same time the method of input should take as little of the display screen as possible. Unfortunately, as the space taken up for input on the display screen is decreased, it can become difficult to increase speed without adversely affecting accuracy and usability.

In spite of a recent surge in the market for pen-based computing devices, many people who generate text still do so with a standard keyboard. To date, pen-based computing has not replaced conventional portable laptop computers, because text input on pen-based computers can be slow, among other reasons. Other devices sacrifice half of the area of the face of the device in order to include a "thumb" keyboard with miniature keys that are difficult to use, time-consuming, and error-prone. At the same time, such an approach means that the area relegated to a physical keyboard can no longer be used to provide a much larger display with correspondingly more efficient and enjoyable access to information. The recent success of the "iPhone" demonstrates that the "all touch-screen" device model has significant advantages in that it can offer a simpler and more intuitive user interface for many of the tasks commonly performed with handheld devices.

Analogous to one-finger typing, one type of input using a virtual keyboard is called "point and tap". A stylus (or more and more commonly, a finger) is moved from letter to letter and a "tap" is performed by contacting the screen on the desired key to select it. This results in the need to constantly lift the stylus from the screen and set it back down again, significantly slowing input. Cursive handwriting was invented to allow a better (and faster) flow from letter to letter and reduce the number of pen (or quill) lifts. In a similar way, the current invention reduces the number of taps required when inputting using an on-screen keyboard, thus speeding text entry.

Handheld devices are designed to fit comfortably in a pocket, and are consequently limited in size. A virtual keyboard that must be displayed on the device's touch-screen is therefore restricted in size. Depending on the target language to be generated and application being used, it may be desirable to be able to generate a large variety of characters from the keyboard. There are generally three methods to achieve this: (1) Reduce the average size of each key to fit a large number of keys on a small keyboard area; (2) Add (and force the user to navigate to) other keyboard layouts from which alternate characters can be generated; or (3) Overload one or more of the keys on the primary keyboard layout so that multiple characters can be generated from a single key by activating it in different ways.

Method 1 is undesirable because the keys tend to become too small to activate easily or reliably. Method 2 is undesirable because the process of navigating between alternate keyboards is inconvenient and time-consuming. Method 3 may require that the user learn novel ways of activating keys, but once learned, this approach is fast and effective.

One very common way of over-loading a key with alternate functionality is to assign an alternative "tap-hold" behavior to a key, where the "base function" of a key is invoked by a "normal tap" of the key (where the key is contacted and the contact is terminated relatively quickly), and an alternative function is invoked by contacting the key and maintaining the contact past an initial time threshold. This approach can be extended, so that maintaining the contact past a second time threshold results in triggering a second alternative function for the key. Another method to overload a key with alternative functions is to define a set of one or more "gestures" that the user can perform following the initial contact with the key. For example, King et al (U.S. Pat. No. 5,953,541) disclose tapping a key and then moving the point of contact in a particular direction to generate one of an ambiguous set of characters assigned to the key. In another example, Buxton (U.S. Pat. No. 6,094,197) disclose tapping a key and then moving the point of contact to exit from the key in a particular direction to apply a function modifier (such as Shift or Control) to the character assigned to the key.

Another function that has been invoked based on the length of time during which contact with a key is continuously maintained is the automatic repetition of activations of the key. This is most commonly found to be useful in, for example, generating a relatively rapid sequence of a large number of activations of the backspace key to delete a relatively large piece of text. It can also be used to generate a large number of repetitions of a single character, such as simulating a horizontal line with a large number of hyphen characters. This has generally been done by providing for an initial time threshold past which contact must continue before the first repeated activation of the contacted key is generated. Additional activations are then generated at regular intervals as long as the contact with the key is continued. In some implementations, these regular intervals also become shorter over time so that additional repetitions occur more rapidly.

There are two problems with automatic key repetition based on the length of time during which contact with a key is continuously maintained. One is that these repetitions tend to be either slower than desired when a large number of repetitions is required, or conversely, faster than desired in order to accurately generate exactly the required number of repetitions (so that either too few—or worse, in the case of a repeated backspace, too many—repetitions are generated). The second problem is that this approach is not compatible with using time-based activation to generate alternate overloaded function definitions for a keyboard.

SUMMARY OF THE INVENTION

The present invention provides systems and methods for gesture repetition that is easy to repeat quickly. A user is able to quickly repeat any activation of a key, including any of the alternate, overloaded functions that are associated with the key. In addition, by appropriately defining the gesture, a large number of these repetitions can be quickly generated. These repeated activations can be generated much faster than a key can be repeatedly tapped with sufficient accuracy, and far faster than an alternative function can be repeatedly generated when each repetition would require again waiting past an initial time threshold. Furthermore, the number of repetitions can be easily and precisely controlled by the user. As the desired number of repetitions is approached, the user simply begins to repeat the gesture at a slower pace until precisely the desired number of repetitions is achieved.

BRIEF DESCRIPTION OF THE DRAWINGS

Preferred and alternative examples of the present invention are described in detail below with reference to the following drawings.

DESCRIPTION OF THE INVENTION

Figure 1:
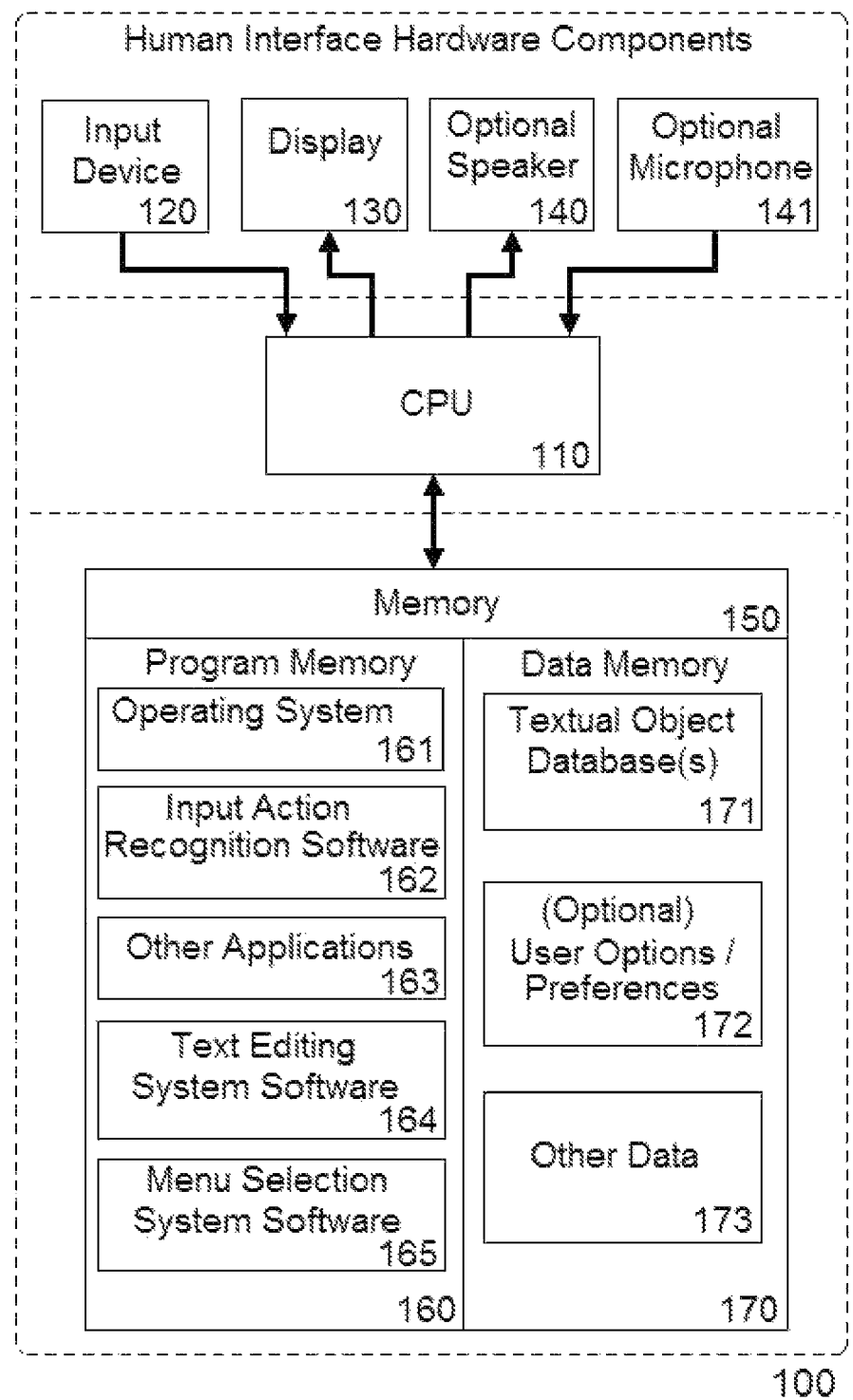
FIG. 1 shows a structural system block diagram showing the typical hardware components of a system that embodies the methods of the text editing and menu selection systems of the present invention.

FIG. 1 shows a simplified block diagram of the hardware components of a typical device 100 in which the present invention is implemented. The device 100 includes one or more input devices 120 that provide input to the CPU (processor) 110 notifying it of actions performed by a user, typically mediated by a hardware controller that interprets the raw signals received from the input device and communicates the information to the CPU 110 using a known communication protocol via an available data port. One example of an input device 120 is a touch-screen that provides input to the CPU 110 notifying it of contact events when the touch-screen is touched by a user. Similarly, the CPU 110 communicates with a hardware controller for a display 130 to draw on the display 130. One example of the display 130 is a touch-screen display that provides graphical and textual visual feedback to a user. Optionally, a speaker 140 is also coupled to the CPU 110 so that any appropriate auditory signals can be passed on to the user as guidance (predominantly for error signals), and a microphone 141 is also coupled to the CPU 110 so that any spoken input can be received from the user (predominantly for input action recognition systems implementing speech recognition as a method of text input by the user). The CPU 110 has access to a memory 150, which may include a combination of temporary and/or permanent storage, and both read-only and writable memory (random access memory or RAM), read-only memory (ROM), writable non-volatile memory such as FLASH memory, hard drives, floppy disks, and so forth. The memory 150 includes program memory 160 that contains all programs and software such as an operating system 161, an input action recognition system software 162, and any other application programs 163. The program memory 160 also contains at least one of a text editing system software 164 for recording and restoring the location of a text insertion position according to the method of the present invention, and a menu selection system software 165 for graphically displaying two or more choices to a user and determining a selection by a user of one of said graphically displayed choices according to the method of the present invention. The memory 150 also includes data memory 170 that includes any textual object database(s) 171 required by the input action recognition system software 162, optional storage for maintaining a record of user options and preferences 172, and any other data 173 required by any element of the device 100.

The present invention introduces a "repetition gesture" that is easy to repeat quickly. The CPU 110 allows a user to quickly repeat any activation of a key, including any of the alternate, overloaded functions that are associated with the key. In addition, by appropriately defining the gesture, a large number of these repetitions can be quickly generated. These repeated activations can be generated much faster than a key can be repeatedly tapped with sufficient accuracy, and far faster than an alternative function can be repeatedly generated when each repetition would require again waiting past an initial time threshold. Furthermore, the number of repetitions can be easily and precisely controlled by the user. As the desired number of repetitions is approached, the user simply begins to repeat the gesture at a slower pace until precisely the desired number of repetitions is achieved. In addition, the repetition gesture can be defined in such a way that it does not "collide" (become easily confused with) other gestures that may be in use on the system such that it becomes a potential source of recognition errors.

For example, consider a keyboard in which the backspace key, when tapped normally, performs the expected function of deleting a single character to the left of the text cursor, and when activated with a "tap-hold" deletes the word to the left of the cursor (similar to a control-backspace on many Windows computers). By tapping the key then performing a repetition gesture before the end of the time threshold for a "tap-hold" activation, the user can precisely delete any desired number of characters to the left of the cursor. By waiting until the "tap-hold" time threshold has elapsed before performing the repetition gesture, the user can precisely delete any desired number of words to the left of the cursor.

The keyboard may be displayed on a touch-sensitive display screen (herein referred to as a touch-screen) and the user contacts the display by means of a stylus or finger. It should be understood, however, that the method can be applied to any system where the user can trace out a continuous path on a displayed keyboard, for example, a standard computer display monitor (not a touch-sensitive screen) where the point of "contact" is the location of an on-screen cursor whose location on the display is controlled by a mouse (or equivalent positional control device) and where the acts of "contacting" and "breaking contact with" the screen are indicated by closing and opening a switch. Alternatively, the beginning and end of a "contact action" is indicated by performing some other equivalent control action, such as "dwelling" near a location (maintaining the position of the mouse cursor within a defined region for a period of time longer than a selected threshold). In another embodiment, the beginning and end of a repetition gesture is defined by one or more recognizable features of a longer contact action which includes the key activation and repetition gesture. For example, in a system which includes a displayed keyboard as part of a larger display area within which the location of a mouse cursor can be controlled, a key activation is indicated by starting with the displayed cursor outside the area defined by the displayed keyboard, and moving the cursor into the keyboard area to the location of an intended key, performing a repetition gesture to effect a desired number of repetitions, then moving the cursor back outside the keyboard area. Such approaches enable the use of other positional control devices such as joysticks, eye-gaze control systems, etc., to control the movement of the displayed cursor over the keyboard, without requiring a separate control mechanism to effect the actions of "contacting" and "breaking contact with" screen.

Thus, the operation of the system will be described with reference to an aspect including a touch-screen contacted by a stylus or finger, but this should not be construed as limiting the scope of the invention, but simply as a means to provide illustrations of some of the present aspects of this method. The method simply processes a user-generated stream of location data, which begin at a known point (in the touch-screen model, the point where the stylus first contacts the screen), proceed through a sequence of data point locations which have a known relationship to a defined virtual keyboard area (in the touch-screen model, the sequence of points detected where the stylus is moved while in contact with the screen), and which end at a known point (in the touch-screen model, the point where the stylus last contacts the screen). In a touch-screen model, the keyboard and stream of data points exist in the same two-dimensional space, but the present invention is equally applicable to a system that can track movement in a three-dimensional space, wherein aspects of the repetition gesture are defined with respect to movement in the third dimension. In certain embodiments, the times when the data points are generated, or equivalently for these embodiments, the time intervals between the data points, are also processed, and can also be provided by various equivalent technologies.

In one embodiment, the repetition gesture includes moving the point of contact back and forth on the touch-screen of the device, wherein an activation of the initially contacted key is repeated for each time the movement of the point of contact changes direction. In a system where the function of a key changes in a time-based manner (as described previously for a Delete-Character/Delete-Word key), the function that is repeated is the function determined according to the time elapsed prior to initiating the repetition gesture. Thus, the repetition gesture can be performed on or near the region associated with the key being repeated.

In one embodiment, in addition to the at least one primary repetition gesture (each repetition of which results in one additional repetition of the activated key function), one or more alternate secondary repetition gestures are also defined, each repetition of which results in a pre-defined fixed number of repetitions of the key function. For example, an alternate repetition gesture includes moving the point of contact in a circular movement, where each time the point of contact moves through a complete 360-degree circle, the key function is repeated ten times. Of course, other specific gestures and other numbers of repetitions can be defined without changing the scope or spirit of the invention. The specific nature of each alternate repetition gesture, and the number of repetitions to be triggered for each performance of an alternate repetition gesture may also be implemented as options selectable by the user.

In one embodiment, the repetition gesture includes an initial component that is performed so that the gesture as a whole is distinct from other gestures that may be meaningful in the system. For example, following the initial key contact (which hereinafter will implicitly include any pause or distinguishing gesture that may be used to specify an alternate function for the contacted key), the point of contact is moved to a designated region of the screen where one or more repetition gestures are them performed. Thus, the repetition gesture can be performed at a location that is distinct from the region associated with the key being repeated. As an example, in the system disclosed by Kushler et al (U.S. Pat. No. 7,098,896), virtually any path traced on the keyboard can be interpreted as an action intended to output a word. This and other patents referenced here are incorporated by reference in their entirety.

Figure 2:
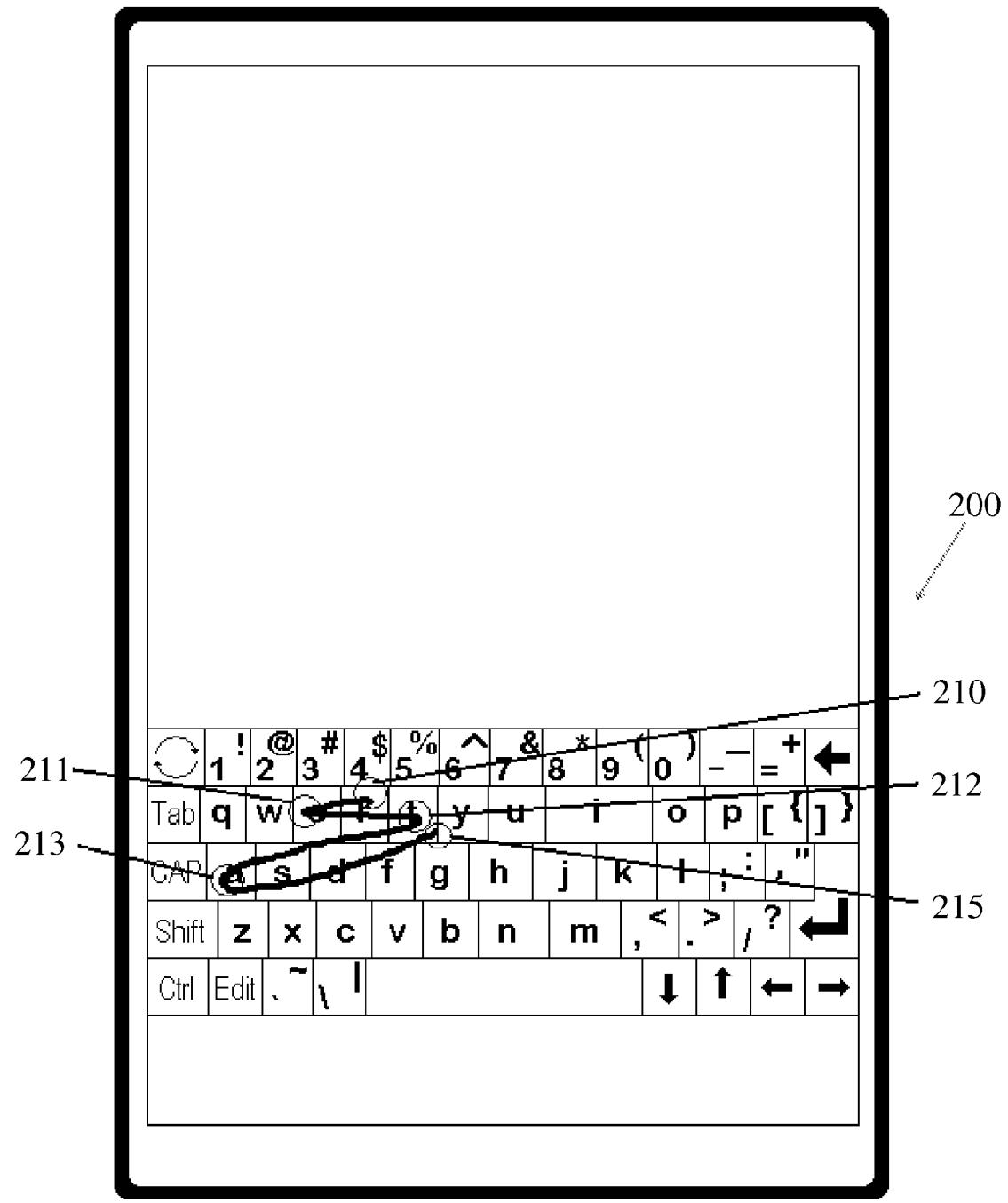
FIGS. 2 and 3 show examples of contact actions on a menu that are structured in one way that takes advantage of the method of the present invention.

For example, FIG. 2 shows a representative touch-screen device with a displayed virtual keyboard in region 200. FIG. 2 shows the path trace of a contact action beginning at a location 210 and ending at a location 215, wherein a user intends to enter the word "retreat" according to the system disclosed by Kushler et al (U.S. Pat. No. 7,098,896), by passing through each of the letters of the word "retreat" in sequence, terminating the path at the location of the final letter "t." In a case where the repetition gesture is defined as simple back-and-forth movement following a key contact, the path trace shown in FIG. 2 would be ambiguous as to whether the path was intended to specify the entry of the word "retreat," or as the activation of the "r" key four times: the initial activation followed by a repetition gesture in which the traced path changes direction three times (at locations 211, 212 and 213) to generate three additional repeated activations of the "r" key. By defining the gesture appropriately, as in the examples described below, an initial component can be included that distinguishes a key repetition gesture from any other gesture used by a system. This avoids the possible introduction of any ambiguity as to how a contact action should be interpreted.

Figure 3:
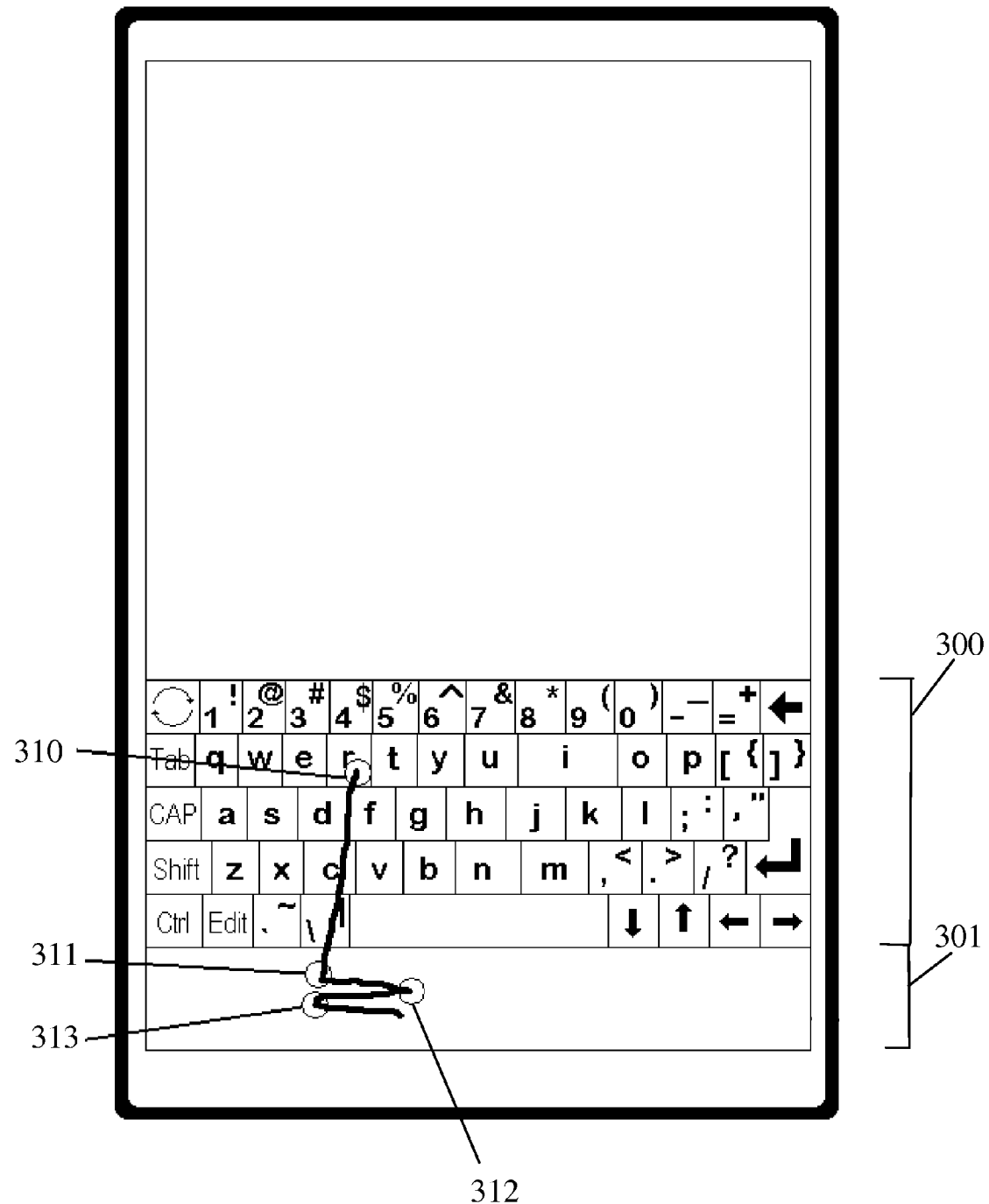

For example, in the system disclosed by Kushler et al, FIG. 3 shows one example of an initial component of a repetition gesture that includes moving off of the keyboard (in the example of FIG. 3, to an area 301 beneath the displayed keyboard 300) following the initial key contact. Once this initial gesture component is performed, then any number of primary or secondary repetition gestures can be performed without being ambiguous with any of the other input paths that the system is designed to process. In the example of FIG. 3, the path trace shown begins at location 310 on the "r" key, moves to region 301 below the keyboard region 300, and changes direction three times at locations 311, 312 and 313 to similarly generate a total of four activations of the "r" key. In contrast to the path trace shown in FIG. 2, the path trace shown in FIG. 3 can be easily distinguished from any that would be intended to generate the output of a word according to the system disclosed by Kushler et al (U.S. Pat. No. 7,098, 896). In a similar manner, an appropriate initial component can be defined for virtually any system that recognizes a set of gestures so that the key repetition gesture can be reliably recognized and distinguished from any other gesture used by the system. The initial component of the repetition gesture can also include time-based aspects, such as one or more pauses or other changes in the velocity of the movement of the point of contact.

While examples of the technology have been described herein, many changes can be made without departing from the spirit and scope of the invention. The various insights embodied in the invention enable text to be input using a touch-screen keyboard more rapidly and efficiently, without limiting the ability to specify other gesture-based methods of input, and allowing time-based key activation to be used as extensively as desired to overload a relatively small number of virtual keys with all of the functionality found to be beneficial in the system. Any type of touch-screen may be used by the system, and the input device may be a stylus, a finger, or any tool that works as an input device on the touch-sensitive screen; as described above, the method can also be used with other types of systems that include a means to control the position of a cursor within the input space. Thus the scope of the method should be determined by the appended claims and their legal equivalents, rather than by the specific aspects described above.

The embodiments of the invention in which an exclusive property or privilege is claimed are defined as follows:

1. A method of controlling an electronic device having one or more defined regions that may be activated in association with a contact action to repeatedly activate a region, the method comprising:
   detecting an activating contact action in one of the defined regions,
   identifying a region activated by the contact action;
   recognizing a subsequent movement of the contact action,
      wherein the subsequent movement comprises a defined initial component and one or more occurrences of a defined repetition gesture,
         wherein the defined repetition gesture comprises movement back and forth, and
         wherein the defined initial component makes the subsequent movement distinct from other gestures made with respect to the identified region, and
      wherein recognizing the subsequent movement comprises recognizing each occurrence of the defined repetition gesture after the defined initial component; and
   generating one or more repetitions of the activation of the identified region for each recognized occurrence of the defined repetition gesture;
      wherein generating one or more repetitions of the activation of the identified region for each occurrence of the defined repetition gesture comprises repeating the activation of the identified region for each time the movement back and forth changes direction.

2. The method of claim 1, wherein the defined initial component of the subsequent movement comprises movement to a region that is not adjacent to the identified region activated by the contact action, or a pause continuing the contact action for a time period exceeding a threshold.

3. The method of claim 1, wherein the defined initial component of the subsequent movement does not generate a repetition of the activation of the identified region.

4. The method of claim 1, further comprising:
   defining an alternate repetition gesture;
   associating multiple repetitions of the activation of the identified region with the defined alternate repetition gesture;
   recognizing the subsequent movement of the contact action as comprising an occurrence of the defined alternate repetition gesture; and
   generating the multiple repetitions of the activation of the identified region for each recognized occurrence of the associated alternate repetition gesture.

5. The method of claim 1, wherein the electronic device comprises a displayed keyboard, and the displayed keyboard includes a set of one or more regions comprising keys wherein each key is associated with one or more characters or functions.

6. An electronic device having one or more defined regions that may be activated in association with a contact action to repeatedly activate a region, the device comprising:
   a means for detecting an activating contact action in one of the defined regions,
   a means for identifying a region activated by the contact action;
   a means for recognizing a subsequent movement of the contact action, wherein the subsequent movement comprises a defined initial component and one or more occurrences of a defined repetition gesture,
      wherein the defined repetition gesture comprises movement back and forth, and
      wherein the defined initial component makes the subsequent movement distinct from other gestures made with respect to the identified region; and
   a means for generating one or more repetitions of the activation of the identified region for each recognized occurrence of the defined repetition gesture;
      wherein generating one or more repetitions of the activation of the identified region for each occurrence of the defined repetition gesture comprises repeating the activation of the identified region for each time the movement back and forth changes direction.

7. The device of claim 6, wherein the defined initial component of the subsequent movement comprises movement to a region that is not adjacent to the identified region activated by the contact action, or a pause continuing the contact action for a time period exceeding a threshold.

8. The device of claim 6, wherein the defined initial component of the subsequent movement does not generate a repetition of the activation of the identified region.

9. The device of claim 6, further comprising:
   defining an alternate repetition gesture;
   associating multiple repetitions of the activation of the identified region with the defined alternate repetition gesture;
   a means for recognizing the subsequent movement of the contact action as comprising an occurrence of the defined alternate repetition gesture; and
   a means for generating the multiple repetitions of the activation of the identified region for each recognized occurrence of the associated alternate repetition gesture.

10. The device of claim 6, wherein the electronic device comprises a displayed keyboard, and the displayed keyboard includes a set of one or more regions comprising keys wherein each key is associated with one or more characters or functions.

11. A computer-readable memory storing computer-executable instructions for causing a computing system having a processor and a touchscreen displaying a virtual keyboard with keys to perform a method for repeating key input, comprising:
   overloading one or more keys with alternative functions or characters;
   defining contact actions for activating characters or functions in overloaded keys, such that different contact actions in an overloaded key generate different characters or functions;
   associating each of the characters or functions in an overloaded key with at least one activating contact action;
   detecting a contact action in an overloaded key;
   identifying the detected contact action as a defined activating contact action;
   determining which of the characters or functions in the overloaded key is associated with the identified activating contact action;

recognizing a subsequent movement of the contact action, wherein the subsequent movement comprises a defined initial component and one or more occurrences of a defined repetition gesture,
  wherein the defined repetition gesture comprises movement back and forth, and
  wherein the defined initial component makes the subsequent movement distinct from other gestures made with respect to the identified key; and
generating one or more repetitions of the activation of the determined character or function for each recognized occurrence of the defined repetition gesture;
  wherein generating one or more repetitions of the activation of the determined character or function for each occurrence of the defined repetition gesture comprises repeating the activation of the determined character or function for each time the movement back and forth changes direction.

12. The computer-readable memory of claim 11, wherein the defined initial component of the subsequent movement comprises movement to a key or region of the touchscreen that is not adjacent to the identified key activated by the contact action, or a pause continuing the contact action for a time period exceeding a threshold.

13. The computer-readable memory of claim 11, wherein the defined initial component of the subsequent movement does not generate a repetition of the activation of the determined character or function.

14. The computer-readable memory of claim 11, further comprising:
defining an alternate repetition gesture;
associating multiple repetitions of the activation of the determined character or function with the defined alternate repetition gesture;
recognizing the subsequent movement of the contact action as comprising an occurrence of the defined alternate repetition gesture; and
generating the multiple repetitions of the activation of the determined character or function for each recognized occurrence of the associated alternate repetition gesture.

15. The method of claim 1, further comprising determining that the recognized subsequent movement does not comprise activation of a different region.

16. The device of claim 6, wherein the contact action comprises use of a joystick or an eye-gaze control system, or a movement in three-dimensional space.

17. The device of claim 6, wherein:
the contact action comprises a user touching the touchscreen with a finger or stylus; and
the subsequent movement of the contact action comprises the user sliding the finger or stylus on the touchscreen.

18. The computer-readable memory of claim 11, wherein:
defining contact actions for activating characters or functions in overloaded keys comprises defining gestures comprising movement in one or more particular directions following initial activation of the key,
such that identifying the detected contact action as a defined activating contact action comprises recognizing movement in a particular direction.

19. The computer-readable memory of claim 11, wherein:
defining contact actions for activating characters or functions in overloaded keys comprises defining a time threshold for the user maintaining activation of the key, such that identifying the detected contact action as a defined activating contact action comprises determining whether the time between the activating contact action and the subsequent movement exceeds the defined time threshold.

20. The computer-readable memory of claim 11, wherein:
a character backspace function is associated with a first activating contact action in an overloaded key, and
a word backspace function is associated with a second activating contact action in the overloaded key,
such that for each occurrence of the defined repetition gesture:
  if the detected contact action is identified as the first activating contact action, generating one or more repetitions comprises repeating the character backspace function; and
  if the detected contact action is identified as the second activating contact action, generating one or more repetitions comprises repeating the word backspace function.

21. The method of claim 4, wherein generating the multiple repetitions of the activation of the identified region for each recognized occurrence of the associated alternate repetition gesture comprises generating ten repetitions of the activation of the identified region for each recognized occurrence of the associated alternate repetition gesture.

22. The method of claim 5, wherein the defined initial component of the subsequent movement comprises movement off of the keyboard.

23. The method of claim 1, wherein the defined repetition gesture includes movement back and forth along an axis.

24. The method of claim 1, wherein repeating the activation of the identified region for each time the movement back and forth changes direction includes an initial activation of the identified region.

25. The method of claim 1, wherein repeating the activation of the identified region for each time the movement back and forth changes direction includes an activation of the identified region for a change of direction from the defined initial component to a movement back or forth.

26. The method of claim 1, wherein repeating the activation of the identified region for each time the movement back and forth changes direction includes an activation of the identified region for the end of a movement back or forth.

27. The method of claim 1, wherein repeating the activation of the identified region for each time the movement back and forth changes direction comprises repeating the activation of the identified region for each back or forth movement, such that one back-and-forth movement generates two activations of the identified region.

28. The method of claim 1, wherein repeating the activation of the identified region for each time the movement back and forth changes direction comprises repeating the activation of the identified region for each change of direction back-to-forth, such that one back-and-forth movement generates one activation of the identified region.

29. The device of claim 6, wherein the defined repetition gesture includes movement back and forth along an axis.

30. The device of claim 6, wherein repeating the activation of the identified region for each time the movement back and forth changes direction includes an initial activation of the identified region.

31. The device of claim 6, wherein repeating the activation of the identified region for each time the movement back and forth changes direction includes an activation of the identified region for a change of direction from the defined initial component to a movement back or forth.

32. The device of claim 6, wherein repeating the activation of the identified region for each time the movement back and forth changes direction includes an activation of the identified region for the end of a movement back or forth.

33. The device of claim 6, wherein repeating the activation of the identified region for each time the movement back and forth changes direction comprises repeating the activation of the identified region for each back or forth movement, such that one back-and-forth movement generates two activations of the identified region.

34. The device of claim 6, wherein repeating the activation of the identified region for each time the movement back and forth changes direction comprises repeating the activation of the identified region for each change of direction back-to-forth, such that one back-and-forth movement generates one activation of the identified region.

35. The computer-readable memory of claim 11, wherein the defined repetition gesture includes movement back and forth along an axis.

36. The computer-readable memory of claim 11, wherein repeating the activation of the determined character or function for each time the movement back and forth changes direction includes an initial activation of the determined character or function.

37. The computer-readable memory of claim 11, wherein repeating the activation of the determined character or function for each time the movement back and forth changes direction includes an activation of the determined character or function for a change of direction from the defined initial component to a movement back or forth.

38. The computer-readable memory of claim 11, wherein repeating the activation of the determined character or function for each time the movement back and forth changes direction includes an activation of the determined character or function for the end of a movement back or forth.

39. The computer-readable memory of claim 11, wherein repeating the activation of the determined character or function for each time the movement back and forth changes direction comprises repeating the activation of the determined character or function for each back or forth movement, such that one back-and-forth movement generates two activations of the determined character or function.

40. The computer-readable memory of claim 11, wherein repeating the activation of the determined character or function for each time the movement back and forth changes direction comprises repeating the activation of the determined character or function for each change of direction back-to-forth, such that one back-and-forth movement generates one activation of the determined character or function.

* * * * *